(12) United States Patent
Xu et al.

(10) Patent No.: US 12,032,879 B2
(45) Date of Patent: Jul. 9, 2024

(54) ELECTROMAGNETIC TRANSIENT SIMULATION METHOD FOR FIELD PROGRAMMABLE LOGIC ARRAY

(71) Applicant: Shanghai Jiao Tong University, Shanghai (CN)

(72) Inventors: Jin Xu, Shanghai (CN); Keyou Wang, Shanghai (CN); Pan Wu, Shanghai (CN); Zirun Li, Shanghai (CN); Guojie Li, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 801 days.

(21) Appl. No.: 17/086,259

(22) Filed: Oct. 30, 2020

(65) Prior Publication Data

US 2021/0049313 A1 Feb. 18, 2021

Related U.S. Application Data

(63) Continuation of application No. PCT/CN2019/106094, filed on Sep. 17, 2019.

(30) Foreign Application Priority Data

Aug. 16, 2019 (CN) .......................... 201910756530.1

(51) Int. Cl.
*G06F 30/20* (2020.01)
*G06F 17/16* (2006.01)
*G06F 119/06* (2020.01)

(52) U.S. Cl.
CPC .............. *G06F 30/20* (2020.01); *G06F 17/16* (2013.01); *G06F 2119/06* (2020.01)

(58) Field of Classification Search
CPC ....... G06F 30/20; G06F 17/16; G06F 2119/06
(Continued)

(56) References Cited

U.S. PATENT DOCUMENTS 5,531,122 A * 7/1996 Chatham .................. G07C 3/00
73/806
6,154,716 A * 11/2000 Lee ....................... G06F 30/367
703/2
(Continued)

FOREIGN PATENT DOCUMENTS

CN 102891483 A 1/2013
CN 106250614 A 12/2016
(Continued)

OTHER PUBLICATIONS

Yue et al. (Node-splitting Approach Used for Network Partition and Parallel Processing in electromagnetic Transient Simulation, IEEE, 2004, pp. 425-430) (Year: 2004).*
(Continued)

*Primary Examiner* — Iftekhar A Khan
(74) *Attorney, Agent, or Firm* — Mei & Mark LLP; Manni Li

(57) ABSTRACT

Electromagnetic transient simulation method applicable to a field programmable gate array (FPGA), which integrates topological parameters of a circuit to be simulated into two matrix parameters in an initialization stage thereof; and voltage and current information at each simulation moment can be obtained only through simple matrix multiplication operation in a main part of the simulation cycle thereof. The method avoids complex initialization operation in the field programmable logic array; meanwhile, the flow of the main part of the simulation cycle in the FPGA is maximally compressed, and the efficiency of electromagnetic transient simulation based on the FPGA is greatly improved.

1 Claim, 2 Drawing Sheets

(58) Field of Classification Search
USPC .......................................................... 703/2
See application file for complete search history.

(56) References Cited

U.S. PATENT DOCUMENTS

| | | | | |
|---|---|---|---|---|
| 7,260,510 B2* | 8/2007 | Sumida | ................ | G06F 30/367 703/2 |
| 8,065,129 B1* | 11/2011 | Rahmat | ................ | G06F 30/367 716/110 |
| 8,326,591 B1* | 12/2012 | Cai | ................ | G06F 30/367 703/13 |
| 10,380,290 B1* | 8/2019 | Rasekh | ................ | G06F 30/367 |
| 10,860,767 B1* | 12/2020 | Farhan | ................ | G06F 17/16 |
| 2003/0065486 A1* | 4/2003 | Sumida | ................ | G05B 17/02 702/189 |
| 2005/0273309 A1* | 12/2005 | Yoneyama | ............ | G06F 30/367 703/14 |
| 2008/0052651 A1* | 2/2008 | Wang | ................ | G06F 30/3312 703/19 |
| 2011/0071812 A1* | 3/2011 | Fang | ................ | G06F 30/367 703/14 |
| 2012/0078605 A1* | 3/2012 | Rahmat | ................ | G06F 30/367 703/14 |
| 2014/0114636 A1* | 4/2014 | Daloukas | ............. | G06F 30/367 703/14 |
| 2016/0080221 A1* | 3/2016 | Ramachandran | ....... | H04L 43/04 709/224 |
| 2016/0373236 A1* | 12/2016 | Ha | ......... | H04J 3/0638 |
| 2017/0061047 A1* | 3/2017 | He | ........... | G06F 17/13 |
| 2017/0132343 A1* | 5/2017 | Joseph | ................ | G06F 30/367 |
| 2017/0153682 A1* | 6/2017 | Duan | ................ | G06F 30/367 |
| 2018/0247003 A1* | 8/2018 | Weiss | ................ | G06F 30/23 |
| 2018/0341882 A1* | 11/2018 | Long | ................ | G06F 30/00 |
| 2019/0067939 A1* | 2/2019 | Sheng | ................ | H02J 3/00 |
| 2020/0096959 A1* | 3/2020 | Gubba Ravikumar | ...................... | G05B 17/02 |
| 2020/0125686 A1* | 4/2020 | Zhu | ................ | G06F 9/542 |
| 2021/0050722 A1* | 2/2021 | Wang | ................ | H02J 3/381 |

FOREIGN PATENT DOCUMENTS

| | | |
|---|---|---|
| CN | 106844900 A | 6/2017 |
| CN | 109299531 A | 2/2019 |
| KR | 20080022403 A | 3/2008 |

OTHER PUBLICATIONS

U.S. Appl. No. 17/024,593 filed Sep. 17, 2020, Keyou Wang et al.

* cited by examiner

ELECTROMAGNETIC TRANSIENT SIMULATION METHOD FOR FIELD PROGRAMMABLE LOGIC ARRAY

CROSS-REFERENCE TO RELATED APPLICATIONS

The subject application is a continuation of PCT/CN2019/106094 filed on Sep. 17, 2019, which claims priority on Chinese Application No. CN201910756530.1 filed on Aug. 16, 2019 in China. The contents and subject matter of the PCT international application and the Chinese priority application are incorporated herein by reference.

TECHNICAL FIELD

The present invention relates to power system, in particular, an improved electromagnetic transient simulation method for a field programmable logic array.

BACKGROUND ART

Electromagnetic transient simulation is an important tool for power system stability analysis and control research. The electromagnetic transient simulation includes off-line simulation and real-time simulation. At present, off-line electromagnetic transient simulation softwares, for examples, Matlab/Simulink and PSCAD/EMTDC, have some common problems such as slow simulation speed, long time consumption, and no support for real-time interaction with external hardware, which cannot meet higher experimental requirements such as hardware-in-loop (HIL). Currently, the real-time electromagnetic transient simulation attracts more and more attention by the virtue of the characteristics of high computing efficiency, good precision, and strong interactivity.

The EMTP (Electro-Magnetic Transient Program) algorithm based on the companion circuit model was first proposed in the late 1960s, and due to its fast simulation speed, high accuracy and good numerical stability, it gradually became the mainstream algorithm of electromagnetic transient simulation. The current off-line electromagnetic transient simulation software is mainly developed based on the EMTP method. However, the EMTP algorithm is mostly run on a general-purpose computer based on the CPU and limited by the hardware computing capacity and high-serialization processing mode. Therefore, it is difficult to support the real-time electromagnetic transient simulation of the power system containing high-frequency power electronic devices.

At present, real-time electromagnetic transient simulation platforms, such as RTDS, RT-LAB etc., have been widely used in the research of power systems, and they all use Field Programmable Gate Array (FPGA) architecture to realize the real-time electromagnetic transient simulation of the power system containing power electronic devices. Different from serial hardwares such as a CPU (central processing unit) etc., the FPGA has the advantages of strong computing capability and high parallelism architecture, the computing speed is guaranteed to realize a small step size of the real-time electromagnetic transient simulation.

The traditional EMTP algorithm is designed based on the CPU architecture. A large number of serial structures exist in a algorithm flow; if it is directly compiled and run on the FPGA, a large number of FPGA hardware resources will be consumed, and the efficiency and real-time performance of real-time simulation are reduced.

SUMMARY OF THE PRESENT INVENTION

The present invention, by integrating topological parameters and compressing a simulation circulation flow in the FPGA, greatly improves the efficiency of the real-time electromagnetic transient simulation. The present invention provides a real-time simulation method suitable for a field programmable logic array (FPGA) which avoids complex initialization operation in the FPGA, simultaneously compresses a flow of a main part of a simulation cycle in the FPGA to the maximum extent, cures the defects of the traditional EMTP algorithm, and greatly improves the efficiency of electromagnetic transient simulation based on the FPGA.

The technical solution of the present invention is as follows.

The electromagnetic transient simulation method for a field programmable logic array of the present invention comprises the following steps, where steps (1) to (5) are initialization stages, and step (6) is the main part of the simulation cycle. The steps of the method are as follows:

(1) sequentially numbering branches and nodes in a circuit to be simulated respectively, wherein the number of a grounding node is 0;

(2) forming a correlation matrix M of a circuit to be simulated according to the following rules:

(i) if a branch p is connected to a node q and a positive current direction defined by the branch p is an outflow from node q, $M(q, p)=1$;

(ii) if the branch p is connected to the node q and the positive current direction defined by the branch p is an inflow to node q, $M(q, p)=-1$;

(iii) if the branch p is not connected to the node q, $M(q, p)=0$;

(3) forming a branch equivalent admittance vector $Y_{eq}$, a node admittance matrix $Y_n$, a voltage coefficient matrix $\alpha$ and a current coefficient matrix $\beta$ of a historical current source expression of the circuit to be simulated according to the following substeps:

(i) respectively replacing each resistance branch, inductance branch, capacitance branch and switch branch with an companion circuit model, wherein each companion circuit respectively comprises an equivalent admittance, and a history current source connected in parallel (the expressions of the equivalent admittances and history current sources of the resistance, inductance, capacitance branches can be obtained by consulting electromagnetic transient simulation textbooks; the expressions of the equivalent admittance and the historical current source of the switch branch can be obtained by consulting relevant documents of a small step size model of the power electronic switch;

(ii) an independent voltage source branch and an independent current source branch are represented by a Norton equivalent circuit, and each Norton equivalent circuit comprises an equivalent admittance, and an equivalent current source connected in parallel;

(iii) forming branch equivalent admittance column vectors $Y_{eq}$ according to the branch numbers by equivalent admittances of all branches, forming branch history current source column vectors $I_{his}$ according to the branch numbers by history current sources of all branches, and forming branch equivalent current source column vectors $I_{src}$ according to the branch numbers by equivalent current sources of all branches, wherein elements at corresponding positions in $I_{src}$ of resistance, inductance, capacitance and switch branches are zero; and the elements at the corresponding positions in $I_{his}$ of the independent voltage source and the independent current source branch are zero;

(iv) calculating a node admittance matrix $Y_n$ of the circuit to be simulated according to the equivalent admittance of each branch (specific methods can refer to electromagnetic transient simulation textbooks);

(v) according to a history current source expression of each branch referred to in 3.1), expressing a relationship between the history current source vector $I_{his}^{n+1}$ is at a $(n+1)^{th}$ simulation moment and the branch voltage vector $V_{brn}^{n}$ and the branch current vector $I_{brn}^{n}$ at a $n^{th}$ simulation moment into the following forms, and obtaining a voltage coefficient matrix $\alpha$ and a current coefficient matrix $\beta$ of the history current source expression:

$$I_{his}^{n+1}=\alpha Y_{eq}V_{brn}^{n}+\beta I_{brn}^{n}$$

(4) forming a node voltage/branch current coefficient matrix P and a history current source coefficient matrix Q which are directly used in the main part of the simulation cycle according to a correlation matrix M, a branch equivalent admittance vector $Y_{eq}$ and a node admittance matrix $Y_n$ of the circuit to be simulated;

$$P = \begin{bmatrix} -Y_n^{-1}M \\ -Y_{eq}M^T Y_n^{-1}M + I \end{bmatrix}$$

$$Q = Y_{eq}M^T Y_n^{-1}M$$

wherein, $Y_n^{-1}$ is the inverse matrix of the node admittance matrix, $M^T$ is the transposed matrix of the correlation matrix, I is an identity matrix with dimensions of $N_{brn}*N_{brn}$, and $N_{brn}$ is the number of branches of the circuit to be simulated;

(5) setting the initial history current source vector $I_{his}^{1}$ to zero, wherein the current simulation moment n is set to 1, and the initialization stage is completed; and the above steps are completed in an upper computer;

(6) completing the following functions mainly by the main part of the simulation cycle, and algorithm compiling in the field programmable logic array (FPGA), further comprising:

(i) calculating a node voltage vector $V_n^{n}$ and a branch current vector $I_{brn}^{n}$ at the current simulation moment according to a history current source vector $I_{his}^{n}$ and an equivalent current source vector $I_{src}^{n}$ at the current simulation moment;

$$\begin{bmatrix} V_n^n \\ I_{brn}^n \end{bmatrix} = P(I_{his}^n + I_{src}^n)$$

(ii) meanwhile, updating the history current source vector $I_{his}^{n+1}$ is at a next simulation moment according to the history current source vector $I_{his}^{n}$ and the equivalent current source vector $I_{src}^{n}$ at the current simulation moment;

$$I_{his}^{n+1}=-(\alpha+\beta)Q(I_{his}^{n}+I_{src}^{n})+\beta(I_{his}^{n}+I_{src}^{n}),$$

wherein, the equivalent current source vector $I_{src}^{n}$ is automatically updated along with the magnitudes of independent voltage sources and independent current sources, diagonal elements corresponding to switch branches in diagonal arrays $\alpha$ and $\beta$ change along with switch states, and other elements remain constant; and (iii) repeatedly running the step (6) until a specified simulation moment or when an instruction of early termination is received, and finishing the simulation.

The present invention has the technical effects.

(1) According to the present invention, initialization is carried out in an upper computer, simulation topological parameters are integrated into two matrixes, and cycle simulation is carried out in a field programmable logic array (FPGA); electric parameters at each simulation moment can be obtained only by carrying out simple matrix calculation to avoid complex initialization operation in the FPGA, and compress a flow of a main part of the simulation cycle in the FPGA to the maximum extent.

(2) Compared with the traditional electromagnetic transient simulation method, the method of the present invention has a higher resource utilization efficiency, and greatly improves efficiency of the electromagnetic transient simulation based on the FPGA. For electromagnetic transient simulation, it is necessary to improve its computational efficiency while ensuring its accuracy. However, the traditional EMTP algorithm is designed based on the CPU architecture. A large number of serial structures exist in a algorithm; if it is directly run on the FPGA, a large number of resources will be consumed, affecting the simulation efficiency and reducing the real-time performance. According to the method, the complex initialization operation is carried out in the upper computer, only the main part of the simulation cycle is carried out in the FPGA, and the simulation process is compressed to the maximum extent in the algorithm. The hardware resources of the FPGA are saved, and the simulation speed is improved.

BRIEF DESCRIPTION OF THE DRAWINGS

FIG. 1A shows the off-line simulation result of a power electronic simulation software PLECS, and FIG. 1B shows the real-time simulation result adopting the method of the present invention.

DETAILED DESCRIPTIONS OF THE PRESENT INVENTION

Figure 2:
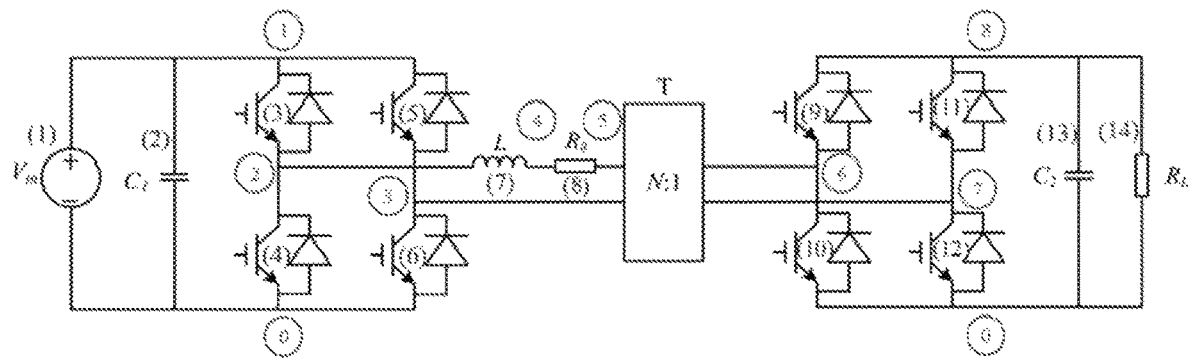
FIG. 2 shows the circuit diagram of the dual active bridge (DAB) in the present invention.

The present invention is described with reference to a dual active bridge (DAB) circuit as shown in FIG. 2, while it should not be construed as limiting the scope of the present invention.

When the method of the present invention is used for specifically realizing the real-time simulation of DAB, the hardware is mainly a PXIe case of American National Instruments (NI), where PXIe-8135 is a PXIe controller mainly responsible for the simulation of a DAB control system, and is communicated with an upper computer via Ethernet to display a real-time simulation waveform on the host computer; and PXIe-7975R is an FPGA module mainly responsible for the DAB circuit simulation, and is connected with an external controller and an oscilloscope via an I/O port so as to preform hardware-in-the-loop simulation. Real-time communication is carried out between the two by a PXIe bus to complete real-time simulation.

Figure 3:
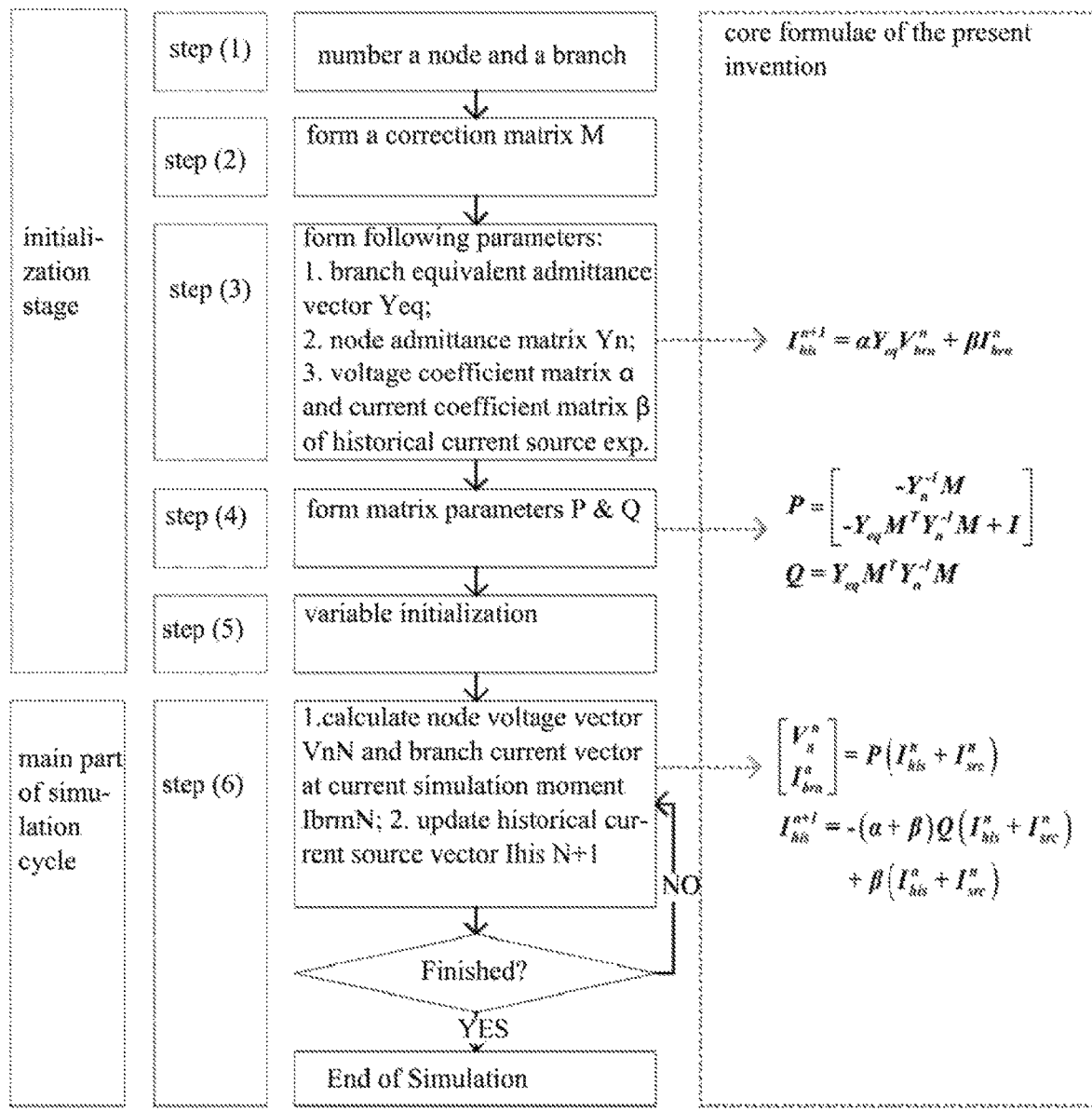
FIG. 3 is a flow diagram showing the electromagnetic transient simulation method for the field programmable logic of the present invention.

The host computer program, the PXIe controller program and the FPGA module program for carrying out real-time simulation through the method of the present invention are programmed and realized by the Labview development environment of American National Instruments (NI). Using the Labview development environment, the host computer can communicate with the PXIe controller, and display simulation waveforms, etc.; and the PXIe controller can communicate with the host computer, read and write data from the FPGA module, simulate the control system of DAB, etc. The above programs do not fall within the scope of the present invention, and there is a related program example on the official website of American National Instruments (NI), so the greater details are not provided here. In the present invention, it is programmed by Labview, and specifically implemented by the FPGA module, and FIG. 3 is a flow chart showing the electromagnetic transient simulation method for the field programmable logic array of the present invention.

In one embodiment of the electromagnetic transient simulation method for the field programmable logic array of the present invention, the method comprises the steps of:

(1) sequentially numbering branches and nodes in a circuit to be simulated respectively, wherein the number of a grounding node is 0, as shown in FIG. 2;

(2) forming a correlation matrix M of a circuit to be simulated;

$$M = \begin{bmatrix} 1 & 1 & 1 & 0 & 1 & 0 & 0 & 0 & 0 & 0 & 0 & 0 & 0 & 0 \\ 0 & 0 & -1 & 1 & 0 & 0 & 1 & 0 & 0 & 0 & 0 & 0 & 0 & 0 \\ 0 & 0 & 0 & 0 & -1 & 1 & 0 & 0 & 0 & 0 & 0 & 0 & 0 & 0 \\ 0 & 0 & 0 & 0 & 0 & 0 & -1 & 1 & 0 & 0 & 0 & 0 & 0 & 0 \\ 0 & 0 & 0 & 0 & 0 & 0 & 0 & -1 & 0 & 0 & 0 & 0 & 0 & 0 \\ 0 & 0 & 0 & 0 & 0 & 0 & 0 & 0 & -1 & 1 & 0 & 0 & 0 & 0 \\ 0 & 0 & 0 & 0 & 0 & 0 & 0 & 0 & 0 & -1 & 1 & 0 & 0 & 0 \\ 0 & 0 & 0 & 0 & 0 & 0 & 0 & 0 & 1 & 0 & 1 & 0 & 1 & 1 \end{bmatrix}$$

Figure 1A:
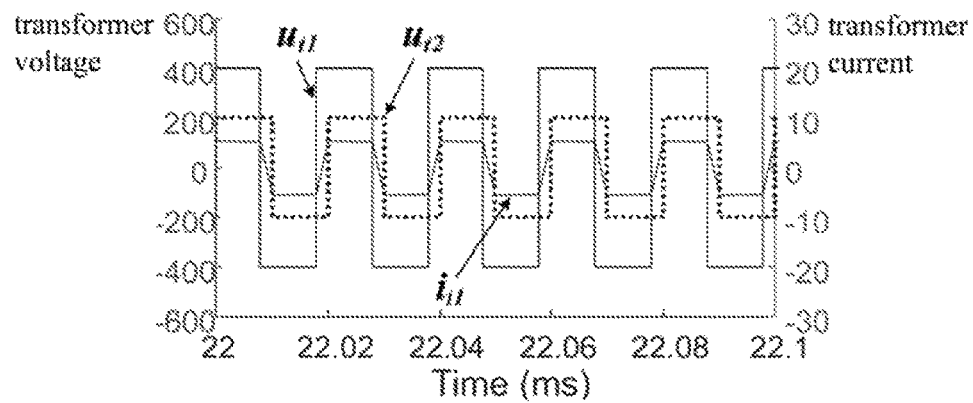
FIGS. 1A and 1B show the comparison of the waveform of transformer voltage and current under the method and off-line simulation, where
Figure 1B:
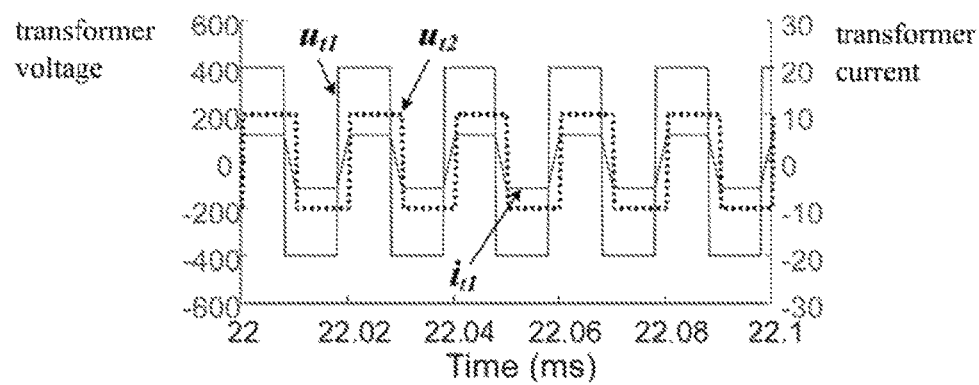

(3) forming a branch equivalent admittance vector $Y_{eq}$, a node admittance matrix $Y_n$, a voltage coefficient matrix $\alpha$ and a current coefficient matrix $\beta$ of a history current source expression of the circuit to be simulated according to the following substeps:

(i) respectively replacing each resistance branch, inductance branch, capacitance branch and switch branch with an companion circuit model, wherein each companion circuit respectively comprises an equivalent admittance, and a history current source connected in parallel, and the equivalent model of the branch is shown in FIGS. 1A and 1B;

(ii) an independent voltage source branch and an independent current source branch are represented by a Norton equivalent circuit, and each Norton equivalent circuit comprises an equivalent admittance, and an equivalent current source connected in parallel;

(iii) forming branch equivalent admittance column vectors $Y_{eq}$ according to the branch numbers by equivalent admittances of all branches, forming branch history current source column vectors $I_{his}$ according to the branch numbers by history current sources of all branches, and forming branch equivalent current source column vectors $I_{src}$ according to the branch numbers by equivalent current sources of all branches, wherein elements at corresponding positions in $I_{src}$ of resistance, inductance, capacitance and switch branches are zero; and the elements at the corresponding positions in $I_{his}$ of the independent voltage source and the independent current source branch are zero (see step 6 for details of specific numerical values of $I_{his}$ and $I_{src}$ in calculation);

$Y_{eq}=[100\ 1600\ 2\ 2\ 2\ 2\ 0\ 3.3\ 2\ 2\ 2\ 2\ 400\ 0]^T$ (iv) calculating a node admittance matrix $Y_n$ of the circuit to be simulated according to the equivalent admittance of each branch (specific methods can refer to electromagnetic transient simulation textbooks);

$$Y_n = \begin{bmatrix} 1.7040 & -0.0020 & -0.0020 & 0 & 0 & 0 & 0 & 0 \\ -0.0020 & 0.0040 & 0 & 0 & 0 & 0 & 0 & 0 \\ -0.0020 & 0 & 0.0040 & 0 & 0 & 0 & 0 & 0 \\ 0 & 0 & 0 & 0.0033 & -0.0033 & 0 & 0 & 0 \\ 0 & 0 & 0 & -0.0033 & 0.0033 & 0 & 0 & 0 \\ 0 & 0 & 0 & 0 & 0 & 0.0040 & 0 & -0.0020 \\ 0 & 0 & 0 & 0 & 0 & 0 & 0.0040 & -0.0020 \\ 0 & 0 & 0 & 0 & 0 & -0.0020 & -0.0020 & 0.4040 \end{bmatrix}$$

(v) according to a history current source expression of each branch referred to in 3.1), expressing a relationship between the history current source vector $I_{his}^{n+1}$ at a $(n+1)^{th}$ simulation moment and the branch voltage vector $V_{brn}^{n}$ and the branch current vector $I_{brn}^{n}$ at a $n^{th}$ simulation moment into the following forms, and obtaining a voltage coefficient matrix $\alpha$ and a current coefficient matrix $\beta$ of the history current source expression (detailed calculation values are shown in the step (6):

$I_{his}^{n+1} = \alpha Y_{eq} V_{brn}^{n} + \beta I_{brn}^{n}$ (4) forming a node voltage/branch current coefficient matrix P and a history current source coefficient matrix Q which are directly used in the main part of the simulation cycle according to a correlation matrix M, a branch equivalent admittance vector $Y_{eq}$ and a node admittance matrix $Y_n$ of the circuit to be simulated;

$$P = \begin{bmatrix} -Y_n^{-1} M \\ -Y_{eq} M^T Y_n^{-1} M + I \end{bmatrix}$$

-continued $$Q = Y_{eq}M^T Y_n^{-1} M$$

$$P = \begin{bmatrix} -5.8754\times10^{-4} & -0.9401 & \cdots & 0 & 0 \\ -5.8754\times10^{-4} & -0.4700 & \cdots & 0 & 0 \\ \vdots & \vdots & \ddots & \vdots & \vdots \\ 0 & 0 & \cdots & 2.0296 & -0.9949 \\ 0 & 0 & \cdots & -0.0398 & 0.9999 \end{bmatrix}_{22\times22}$$

$$Q = \begin{bmatrix} 0.0588 & 0.0588 & \cdots & 0 & 0 \\ 0.9401 & 0.9401 & \cdots & 0 & 0 \\ \vdots & \vdots & \ddots & \vdots & \vdots \\ 0 & 0 & \cdots & 0.9949 & 0.9949 \\ 0 & 0 & \cdots & 9.9493\times10^{-5} & 9.9493\times10^{-5} \end{bmatrix}_{22\times22}$$

wherein, $Y_n^{-1}$ is an inverse matrix of the node admittance matrix, $M^T$ is a transpose matrix of the correlation matrix, I is an identity matrix with dimensions of $N_{brn}*N_{brn}$, and $N_{brn}$ is the number of branches of the circuit to be simulated;

(5) setting the initial history current source vector $I_{his}^1$ to zero, wherein the current simulation moment n is set to 1, and the initialization stage is completed; and the above steps are completed in an host computer;

(6) completing the following functions mainly by the main part of the simulation cycle, and algorithm compiling in the field programmable logic array (FPGA) (taking n=10 as an example):

(i) calculating a node voltage vector $V_n^n$ and a branch current vector $I_{brn}^n$ at the current simulation moment according to a history current source vector $I_{his}^n$ and an equivalent current source vector $I_{src}^n$ at the current simulation moment;

$$\begin{bmatrix} V_n^n \\ I_{brn}^n \end{bmatrix} = P(I_{his}^n + I_{src}^n)$$

$I_{his}^{10}=[0\ -180.9965\ 90.8266\ -304.9359\ -304.9359$
$\quad 90.8266\ 3.1455\ 0\ -6.6805\ -0.5579\ -0.5579$
$\quad -6.6805\ -0.0511\ 0]^T$ $I_{src}^{10}=[-40000\ 0\ 0\ 0\ 0\ 0\ 0\ 0\ 0\ 0\ 0\ 0\ 0]^T$ $V_n^{10}=[180.9965\ 182.1912\ -1.1947\ 1.0197\ 0.0761$
$\quad 0.3433\ -0.2921\ 0.0511]^T$ $I_{brn}^{10}=[-21900.3489\ 21717.0625\ 93.2160\ 90.0705$
$\quad 90.0705\ 93.2160\ 3.1455\ 3.1455\ -6.0962\ 0.1948$
$\quad 0.1948\ -6.0962\ 5.8993\ 0.0020]^T$ (ii) meanwhile, updating the history current source vector $I_{his}^{n+1}$ at a next simulation moment according to the history current source vector $I_{his}^n$ and the equivalent current source vector $I_{src}^n$ at the current simulation moment;

$I_{his}^{n+1}=-(\alpha+\beta)Q(I_{his}^n+I_{src}^n)+\beta(I_{his}^n+I_{src}^n)$ $\alpha'=[0\ -1\ 1\ -1\ -1\ 1\ 0\ 0\ 1\ -1\ -1\ 1\ -1\ 0]$, $\alpha=\text{diag}(\alpha')_{14\times14}$ $\beta'=[0\ 0\ 1\ 0.66\ 0.66\ 1\ 1\ 0\ 1\ 0.66\ 0.66\ 1\ 0\ 0]$, $\beta=\text{diag}(\beta')_{14\times14}$ $I_{his}^{11}=[0\ -193.7770\ 86.3684\ -333.7840\ -333.7840$
$\quad 86.3684\ 3.7502\ 0\ -7.9206\ -0.6259\ -0.6259$
$\quad -7.9206\ -0.0689\ 0]^T$ wherein, the equivalent current source vector $I_{src}^n$ is automatically updated along with the magnitudes of independent voltage sources and independent current sources, diagonal elements corresponding to switch branches in diagonal arrays α and β change along with switch states, and other elements remain constant; and (iii) repeatedly running the step (6) until a specified simulation moment or when an instruction of early termination is received, and finishing the simulation.

$I_{his}^{11}=[0\ -193.7770\ 86.3684\ -333.7840\ -333.7840$
$\quad 86.3684\ 3.7502\ 0\ -7.9206\ -0.6259\ -0.6259$
$\quad -7.9206\ -0.0689\ 0]^T$ $I_{src}^{11}=[-40000\ 0\ 0\ 0\ 0\ 0\ 0\ 0\ 0\ 0\ 0\ 0\ 0]^T$ $V_n^{11}=[193.7770\ 194.8916\ -1.1145\ 1.3884\ 0.2633$
$\quad 0.3789\ -0.3100\ 0.0689]^T$ $I_{brn}^{11}=[-20622.2958\ 20448.8510\ 88.5975\ 84.8473$
$\quad 84.8473\ 88.5975\ 3.7502\ 3.7502\ -7.3006\ 0.1999$
$\quad 0.1999\ -7.3006\ 7.0979\ 0.0028]^T$ $\alpha'=[0\ -1\ 1\ -1\ -1\ 1\ 0\ 0\ 1\ -1\ -1\ 1\ -1\ 0]$, $\alpha=\text{diag}(\alpha')_{14\times14}$ $\beta'=[0\ 0\ 1\ 0.66\ 0.66\ 1\ 1\ 0\ 1\ 0.66\ 0.66\ 1\ 0\ 0]$, $\beta=\text{diag}(\beta')_{14\times14}$ $I_{his}^{12}=[0\ -205.8112\ 82.2295\ -360.9527\ -360.9527$
$\quad 82.2295\ 4.3911\ 0\ -9.2285\ -0.6965\ -0.6965$
$\quad -9.2285\ -0.0898\ 0]^T$ Table 1 shows DAB circuit parameters for real-time simulation under the method of the present invention. Table 2 shows the utilization of hardware resources in real-time simulation of DAB under the method of the present invention. Table 3 shows the simulation step sizes and running time in one step size per cycle for real-time simulation of DAB under the method of the present invention.

TABLE 1

| DAB Circuit Parameters | | |
| --- | --- | --- |
| Parameters | Symbols | Values |
| Input voltage | $V_{in}$ | 400 V |
| Capacitance at a high voltage side | $C_1$ | 800 μF |
| Transformer leakage inductance | L | 160 μH |
| Conductive loop resistance | $R_0$ | 0.3 Ohm |
| Transformer transformation ratio | N | 2:1 |
| Capacitance at a low voltage side | $C_2$ | 200 μF |
| Resistive load | $R_L$ | 25 Ohm |

TABLE 2

| Hardware resource utilization | |
| --- | --- |
| Hardware resources | Utilization rate |
| Total number of logical slices | 36.9% (23419 of 63550) |
| Logic slice register | 15.3% (77752 of 508400) |
| Logic slice LUT | 24.8% (63107 of 254200) |

TABLE 2-continued

Hardware resource utilization

| Hardware resources | Utilization rate |
| --- | --- |
| RAM block | 11.4% (91 of 795) |
| DSP48 | 13.3% (205 of 1540) |

TABLE 3

Real-time Performance

| Types of time | Length of time |
| --- | --- |
| Step size (ns) | 500 |
| Runtime (ns) in each step size | 218.75 |

We claim:

1. A method for real-time electromagnetic transient simulation based on a field programmable logic array (FPGA) for power system stability analysis and control research, comprising providing a host computer and a field programmable logic array (FPGA) for real-time electromagnetic transient simulation of a circuit of a power system, performing an initialization operation in the host computer, wherein a history current source vector $I_{his}^{1}$, an equivalent current source vector $I_{src}^{n}$, voltage coefficient matrix $\alpha$, and current coefficient matrix $\beta$ of a history current source expression are obtained through the following steps of (1) to (5):

(1) sequentially numbering branches and nodes in the circuit to be simulated respectively, wherein the number of a grounding node is 0;

(2) forming a correlation matrix M of the circuit to be simulated according to the following rules:
  (i) if a branch p is connected to a node q and a positive current direction defined by the branch p is an outflow node q, M (q, p)=1;
  (ii) if the branch p is connected to the node q and the positive current direction defined by the branch p is an inflow node q, M (q, p)=−1;
  (iii) if the branch p and the node q are not connected, M (q, p)=0;

(3) forming a branch equivalent admittance vector $Y_{eq}$, a node admittance matrix $Y_n$, a voltage coefficient matrix $\alpha$, and a current coefficient matrix $\beta$ of a history current source expression of the circuit to be simulated according to the following substeps:
  (i) respectively replacing each resistance branch, inductance branch, capacitance branch and switch branch with an companion circuit model, wherein each companion circuit respectively comprises an equivalent admittance, and a history current source connected in parallel;
  (ii) an independent voltage source branch and an independent current source branch are represented by a Norton equivalent circuit, and each Norton equivalent circuit comprises an equivalent admittance, and an equivalent current source connected in parallel;
  (iii) forming branch equivalent admittance column vectors $Y_{eq}$ according to the branch numbers by equivalent admittances of all branches, forming branch history current source column vectors $I_{his}$ according to the branch numbers by history current sources of all branches, and forming branch equivalent current source column vectors $I_{src}$ according to the branch numbers by equivalent current sources of all branches, wherein elements at corresponding positions in $I_{src}$ of resistance, inductance, capacitance and switch branches are zero; and the elements at the corresponding positions in $I_{his}$ of the independent voltage source and the independent current source branch are zero;

(iv) calculating a node admittance matrix $Y_n$ of the circuit to be simulated according to the equivalent admittance of each branch;

(v) calculating the voltage coefficient matrix $\alpha$ and the current coefficient matrix $\beta$ of the history current source expression, wherein the formula is as follows:

$$I_{his}^{n+1} = \alpha Y_{eq} V_{brn}^{n} + \beta I_{brn}^{n}$$

wherein, $I_{his}^{n+1}$ is a history current source vector at a $(n+1)^{th}$ simulation moment, a branch voltage vector at a $n^{th}$ simulation moment and a branch current vector at the $n^{th}$ simulation moment;

(4) forming a node voltage/branch current coefficient matrix P and a history current source coefficient matrix Q according to the correlation matrix M, the branch equivalent admittance vector $Y_{eq}$ and the node admittance matrix $Y_n$ of the circuit to be simulated;

$$P = \begin{bmatrix} -Y_n^{-1}M \\ -Y_{eq}M^T Y_n^{-1}M + I \end{bmatrix}$$

$$Q = Y_{eq}M^T Y_n^{-1}M$$

wherein, $Y_n^{-1}$ is an inverse matrix of the node admittance matrix, $M^T$ is a transpose matrix of the correlation matrix, I is an identity matrix with dimensions of $N_{brn}*N_{brn}$, and $N_{brn}$ is the number of branches of the circuit to be simulated; and (5) setting the initial history current source vector $I_{his}^{1}$ to zero and the current simulation moment n to 1 at end of the initiation operation;

performing one or more cycles of simulation in the FPGA, wherein electric parameters at each simulation moment in each simulation cycle are obtained by a compressed matrix calculation in the FPGA through the following steps of (6) and (7):

(6) calculating a node voltage vector $V_n^{n}$ and a branch current vector $I_{brn}^{n}$ at the current simulation moment according to the history current source vector $I_{his}^{n}$ and the equivalent current source vector $I_{src}^{n}$ at the current simulation moment, and updating the history current source vector $I_{his}^{n+1}$ at a next simulation moment, wherein the formula is as follows:

$$\begin{bmatrix} V_n^{n} \\ I_{bm}^{n} \end{bmatrix} = P(I_{his}^{n} + I_{src}^{n})$$

$$I_{his}^{n+1} = -(\alpha + \beta)Q(I_{his}^{n} + I_{src}^{n}) + \beta(I_{his}^{n} + I_{src}^{n})$$

wherein, the equivalent current source vector $I_{src}^{n}$ is automatically updated along with the n magnitudes of independent voltage sources and independent current sources, diagonal elements corresponding to switch branches in diagonal arrays $\alpha$ and $\beta$ change instantly along with switch states, and other elements remain constant; and (7) returning to the step (6) when the next simulation moment n+1 becomes the current simulation moment, and running the steps (6) and (7) repeatedly to update the electric parameters real-time in the FPGA;

displaying real-time simulation waveforms of the electric parameters obtained by the FPGA at each simulation moment in the host computer, and conducting stability analysis and control research of the power system based on the displayed real-time simulation waveforms; and terminating the simulation until a predetermined simulation moment is reached or an instruction of early termination is received.

\* \* \* \* \*